Figure 1:
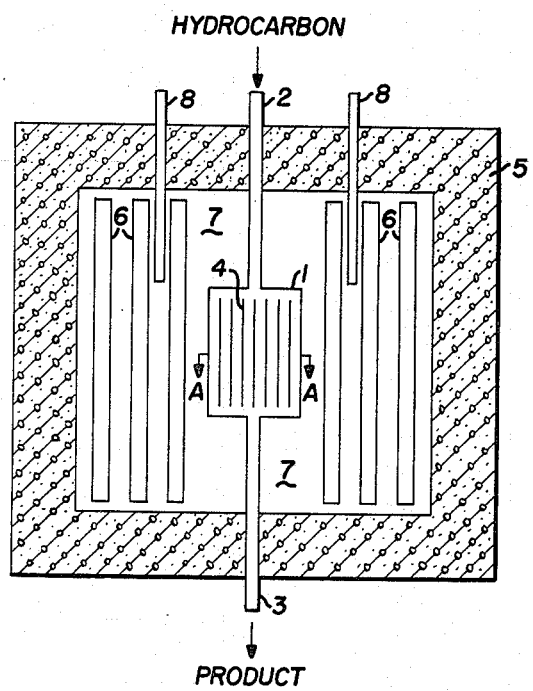

Sept. 22, 1959　　　　E. P. WIGNER　　　　2,905,610
CONDUCTING HYDROCARBON CONVERSIONS IN NUCLEAR REACTORS
Filed June 22, 1956

Eugene P. Wigner　　　Inventor

By L. A. Strimbeck　　　Attorney

2,905,610
CONDUCTING HYDROCARBON CONVERSIONS IN NUCLEAR REACTORS

Eugene P. Wigner, Princeton, N.J., assignor to Esso Research and Engineering Company, a corporation of Delaware Application June 22, 1956, Serial No. 593,159

5 Claims. (Cl. 204—193)

The present invention relates to the conversion of hydrocarbons in the presence of high intensity ionizing radiation obtained from a nuclear reactor. It is more particularly concerned with a method and apparatus for efficiently obtaining high intensity gamma irradiation from nuclear reactors for hydrocarbon conversions, while greatly reducing the amount or ratio of slow or thermal neutrons in the reaction zone.

In brief compass, this invention proposes an improved radiochemical hydrocarbon conversion process which comprises converting a hydrocarbon reactant in a reaction zone by exposure to neutron irradiation. The reaction zone contains a pair of spaced, parallel plates formed from a thermal neutron-capturing material that has a thermal neutron capture cross-section above 100 barns.

The parallel plates, preferably formed from cadmium, are arranged to permit capture of a major amount of the thermal neutrons produced by the moderating effect on the fast neutrons of the reactant between the plates.

The prior art has proposed the conversion of hydrocarbons, particularly petroleum oils, by exposure to high intensity ionizing radiation, particularly that obtained from nuclear reactors. Use of nuclear radiation for radiochemical conversions has many problems associated with it. One problem is that it is difficult to separate the different types of radiation originating in a nuclear reactor, particularly if it is desired to maintain a high intensity of a particular type of radiation—say, gamma. In controlling or converting the different types of radiation from a nuclear reactor, a needless loss of the energy from the fission reaction usually results and the process is, therefore, inefficient. For example, if it is desired to greatly reduce the thermal neutron flux in a reaction zone, this normally has been done only at the expense of gamma ray activity. In a swimming pool type of reactor, which is surrounded by water, the fast neutrons have a long mean-free path and penetrate very deep into the water sheet before they are completely slowed down or thermalized. It is difficult to shield a reaction zone from slow neutrons in such a reactor because the fast neutrons readily penetrate the shield, and then are thermalized by the reactant in the reaction zone.

Also, it is often desirable to prevent as much as possible exposure of some hydrocarbon reactants to thermal neutrons because of the presence of contaminates, such as sulfur, in the reactant. It is the thermal neutrons that most often cause the conversion of elements into radioactive isotopes. For this reason, thermal neutrons are desirably eliminated or minimized as much as possible during the conversion of hydrocarbon reactants, which in many cases, contain substantial amounts of impurities. Thermal neutrons are also not desired in a hydrocarbon reaction zone because they induce reactions which are different from those induced by the gamma rays and thus may lead to the formation of undesired by-products.

The present invention proposes a process and apparatus whereby the flux of thermal neutrons in a hydrocarbon reaction zone irradiated by neutrons obtained from a nuclear reactor is efficiently kept at a minimum, i.e., well below 1% of the flux of gamma rays. It also is concerned with a method for converting the energies of thermal neutrons to other types of radiation in an efficient manner heretofore unappreciated by the art.

This invention proposes to place within a neutron irradiated hydrocarbon reaction zone, parallel surfaces or plates formed from a material that has a high capture cross-section for thermal neutrons having energies below about one E.V. The thickness of these plates is sufficient such that over 90% or more of neutrons around or below this energy level are converted to secondary radiation, i.e., alpha, beta or gamma, preferably gamma. The spacing of the parallel plates is such that the slow neutrons will strike it with a probability close to one before having travelled a long distance along their zig-zag path, i.e., before having caused an appreciable thermal flux. The total mass of the plates, however, is not so great as to absorb a considerable fraction of the desired radiation.

Thus, according to this invention, thermal neutrons obtained from fast neutrons that have penetrated the reaction zone and have been thermalized contiguous to or in the reaction zone, are removed or eliminated from the reaction space relatively rapidly by the parallel surfaces. Thermal neutrons incident on the parallel surfaces are converted to secondary radiation, preferably gamma, and a large flux of thermal neutrons is not permitted to exist within the hydrocarbon conversion zone. Those fast neutrons that do pass through one of the parallel surfaces, are thermalized or slowed down by the hydrocarbon reactant between the surfaces and then we are captured by the next parallel surface.

It will be appreciated by those skilled in the art that this arrangement permits most efficient use of the fission energy created within a nuclear reactor, while markedly reducing activation of impurities such as sulfur.

The thermal neutron capturing surfaces used to shield the reaction zone are arranged in a uniform geometric pattern. A multiplicity of closely spaced circular pipes, e.g., arranged in the form of a multitube heat exchanger with the reactant on the tube side, can be used. For most efficient utilization of the reaction space, however, it is much preferred to use parallel surfaces arranged in a honeycomb pattern, either square or hexagonal.

The distance between the parallel surfaces is dependent upon many factors. Usually the spacing is inversely proportioned to the density of the reaction mixture between the plates, e.g., whether it is in gaseous or condensed phase. The hydrogen to carbon ratio of the reactant, the presence of impurities or extraneous materials such as catalysts, the activation characteristics of activatable impurities, etc., all influence the spacing of the parallel surfaces. Using cadmium with liquid hydrocarbons the spacing will be in the range of ¼-inch to one inch, to give thermal neutron flux reduction of 99.9 to 95%.

The neutron source or the fissionable material can be external to or surround the reaction zone, but the reverse may be true, i.e., the neutron source may be surrounded by hydrocarbon reactant. Any convenient type of nuclear reactor, e.g., a heterogeneous or homogeneous one, can be used. In many instances it will be desirable to use the reactor for other purposes as well as for hydrocarbon conversions. For example, the reactor can also be used to breed fissionable material or to generate power.

The parallel surfaces or plates are formed from material that gives off, preferably, gamma radiation upon neutron capture, and has a sufficiently high capture cross-section for thermal neutrons to be practical. The concentration of the thermal neutron-capturing material in the composition forming the plates is such that the composition has, on the average, a thermal neutron-capture cross-section greater than 100 barns. Cadmium, specifically cadmium 113, is the material of primary interest although, more broadly, the preferred materials are cadmium, boron, cobalt, alloys thereof, and mixtures thereof. As other examples of alpha, beta and gamma producing radiation materials, there might be mentioned gadolinium, samarium, europium, iridium, lithium, nitrogen, and as an example of a separated isotope, beryllium 7. These materials can exist as pure elements or isotopes, or as compounds. Mixtures of the isotopes or compounds thereof can be used. The neutron-capturing materials can be alloyed or admixed with other diluting or supporting materials, if desired, such as aluminum. Mixtures of alpha, beta or gamma producing materials can, of course, be used, e.g., boron 10 can be admixed with cadmium 113. The parallel plates can be suitably protected, if necessary, by being jacketed or coated, e.g., with aluminum or stainless steel.

Besides the hydrocarbons to be converted, the reactant stream can contain other materials, either solid, liquid, or gaseous, designed to promote or favor the reaction. Thus, steam or water, air, inert gases, acids, gaseous cracking catalysts, inert solids such as absorbents, and cracking catalysts such as alumina, silica-alumina, or platinum, or molybdenum on alumina can be used. Solids, when used, can be used in the form of a suspensoid type of operation, i.e., where they are carried through the reaction zone by the hydrocarbon reactant. The solids can also be used as fixed, fluid, or gravitating beds within the reaction zone.

The pressure used can vary over a wide range, but will generally lie within the range of 0 to 1000 p.s.i.g. The temperature of the reaction can also vary over a wide range, say from −50° F. to above 1200° F., but generally will lie within the range of 100° to 700° F. An advantage of irradiation induced reactions is that hydrocarbon conversions can normally be carried out at temperatures substantially lower than those previously possible. This permits the avoidance of undesirable secondary reactions. Means can be provided for heating the reactants within the reaction zone, and/or the reactants can be preheated before being introduced into the reaction zone.

As specific types of conversions and feed stocks that may be carried out according to this invention, there might be mentioned the reforming of petroleum naphthas boiling in the range of about 200° to 430° F., to obtain a higher octane product. Gas oils may be cracked to obtain lower boiling products. Light unsaturated gases, such as ethylene, can be polymerized under the influence of irradiation.

The following description of the drawing attached to and forming a part of this specification will serve to make this invention clear.

Figure 2:
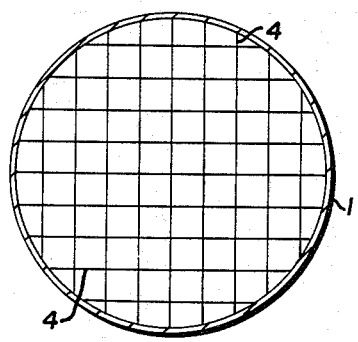

Figure 1 of the drawing schematically illustrates, in cross-section, one form of the apparatus of this invention. Figure 2 illustrates in enlarged detail a cross-section view of the interior of the hydrocarbon reaction zone shown in Figure 1, as indicated by line A—A.

In Figure 1, the hydrocarbon reaction zone is contained within a cylindrical container 1. Hydrocarbon reactant is introduced into this container by line 2, and irradiated product is removed by line 3. Within the reaction zone are a series or plurality of parallel surfaces 4, formed from a neutron-capturing, gamma ray emitting material, e.g., cadmium. Container 1 is contained within a nuclear reactor. This reactor may comprise a suitable radiation shield, for example, concrete 5, in the form of a cube. Inside the cube are uranium, or other fissionable material, fuel rods 6, disposed about reaction zone 1. Surrounding the fuel rods is a moderator material, e.g., water 7, although other materials such as graphite can be used. Suitable control rods 8 are used to control the neutron density or flux within the cube.

Figure 2, showing a cross-section of a reaction zone, illustrates a square arrangement of the parallel cadmium surfaces used to control the thermal neutron flux within the hydrocarbon reaction zone. As illustrated, container 1 encloses sheets of cadmium 4 arranged in a geometric pattern of squares.

The product removed by line 3 may be further treated as desired. Thus, any solid materials may be removed by filtration, sedimentation, fractionation, etc., and if desired, recycled to the inlet. The products may be separated as by fractionation, extraction, adsorption, etc. to obtain certain desired product fractions. Also, the products may be treated as by storage, distillation or ion exchange, to reduce the radioactivity thereof.

*Example*

The reaction one comprises a cylinder about one ft. in diameter and a few ft. tall, formed from stainless steel about ⅛-inch thick. Within this stainless steel cylinder are cadmium sheets arranged on ½-inch square centers. The cadmium has a neutron-capture cross-section of about 2500 barns for thermal neutrons having an energy in the range of about 0.025 E.V. Each sheet or parallel surface is about $\frac{1}{64}$-inch thick so that 99.99% of neutrons in this energy range which strike a plate are converted to gamma radiation. A total of 50 pounds of cadmium is used. This leaves about 94% of the reaction space within the stainless steel cylinder for the hydrocarbon reactant.

Having described this invention, what is sought to be protected by Letters Patent is succinctly set forth in the following claims.

What is claimed is:

1. An apparatus for irradiating a fluid hydrocarbon with neutrons and gamma rays, comprising: a hydrocarbon reaction chamber adapted to be placed contiguous to a nuclear reactor and interiorly receive neutron irradiation comprising at least in part fast neutrons in hydrocarbon converting amounts, a plurality of parallel plates in said chamber spaced to form a plurality of passageways, said plates being formed from a material that has an average capture cross-section above 100 barns for thermal neutrons having an energy below one electron volt and being arranged in a uniform geometric pattern and spaced such that over 90% of the thermal neutrons produced by the moderating effect of the fluid hydrocarbon in said passageways are converted to secondary radiation by said plates and the flux of thermal neutrons in said chamber is less than 1% of the flux of gamma rays, the thickness of each of said plates being sufficient to convert at least 90% of thermal neutrons incident thereon to secondary radiation, conduit means for introducing a fluid hydrocarbon into said chamber and into said passageways, and conduit means for removing irradiated hydrocarbon from said passageways and said chamber.

2. The apparatus of claim 1 wherein said plates are formed from material that gives rise to secondary gamma radiation upon capture of thermal neutrons.

3. The apparatus of claim 1 wherein said plates are arranged in a honeycomb pattern.

4. The apparatus of claim 1 wherein said plates are arranged in a geometric pattern of squares.

5. The apparatus of claim 1 wherein said plates are formed from cadmium and the spacing between plates is in the range of ¼ to one inch, whereby the thermal neutron flux in said chamber is reduced 99.9 to 95% of what said flux would be in the absence of said plates.

References Cited in the file of this patent

UNITED STATES PATENTS

| | | |
|---|---|---|
| 2,708,656 | Fermi et al. | May 17, 1955 |
| 2,743,226 | Newson | Apr. 24, 1956 |

FOREIGN PATENTS

| | | |
|---|---|---|
| 697,601 | Great Britain | Sept. 23, 1953 |

OTHER REFERENCES

Mayer et al.: MDDC–171, May 8, 1946, declassified July 2, 1946, 8 pages.

Francis: IDO–16189, Aug. 11, 1954, declassified Aug. 26, 1955, 46 pages.